No. 791,305. PATENTED MAY 30, 1905.
L. T. WEISS.
ART OF SEPARATING GOLD OR OTHER DIAMAGNETIC METALS.
APPLICATION FILED AUG. 26, 1903.

WITNESSES:
Eric Tidestrom

INVENTOR
Louis T. Weiss
BY
ATTORNEY

No. 791,305.  
Patented May 30, 1905.

UNITED STATES PATENT OFFICE.

LOUIS T. WEISS, OF NEW YORK, N. Y.

ART OF SEPARATING GOLD OR OTHER DIAMAGNETIC METALS.

SPECIFICATION forming part of Letters Patent No. 791,305, dated May 30, 1905.

Application filed August 26, 1903. Serial No. 170,772.

*To all whom it may concern:*

Be it known that I, LOUIS T. WEISS, a citizen of the United States, residing in the borough of Brooklyn, in the county of Kings and city and State of New York, have invented certain new and useful Improvements in the Art of Separating Gold or other Diamagnetic Metals, of which the following is a specification.

This invention relates, broadly, to the separation of particles of diamagnetic metals—such as gold, for example—from sand and other material with which the said metallic particles may be mixed.

It is well known that particles of magnetic metals—such as iron, for example—may be separated from granular or powdered material which is n    magnetic with the aid of magnets, and it is also well known that under ordinary conditions particles of gold and other diamagnetic metals cannot be thus separated from diamagnetic granular material with which they are mixed; but it is the purpose of the present invention to so treat the particles of diamagnetic metal which it is desired to separate from a mass of granular material with which they are mixed that they may be separated from the latter by a magnet or magnets without previous amalgamation.

To this end my improvement in the art consists in coating or plating each particle of the diamagnetic metal in a mass with iron by electroplating and then removing said plated or coated particles with a magnet or magnets.

I do not herein claim nor limit myself to any special apparatus for carrying out the process I claim; but in the accompanying drawings an apparatus is illustrated by which the end may be attained.

Figure 1:
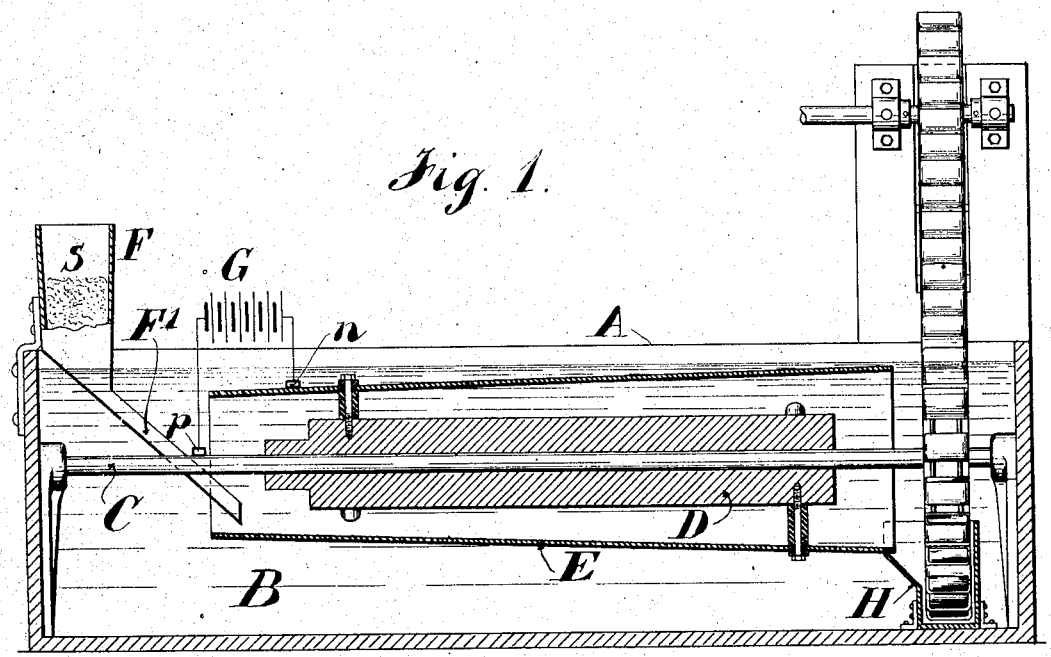
Figure 2:
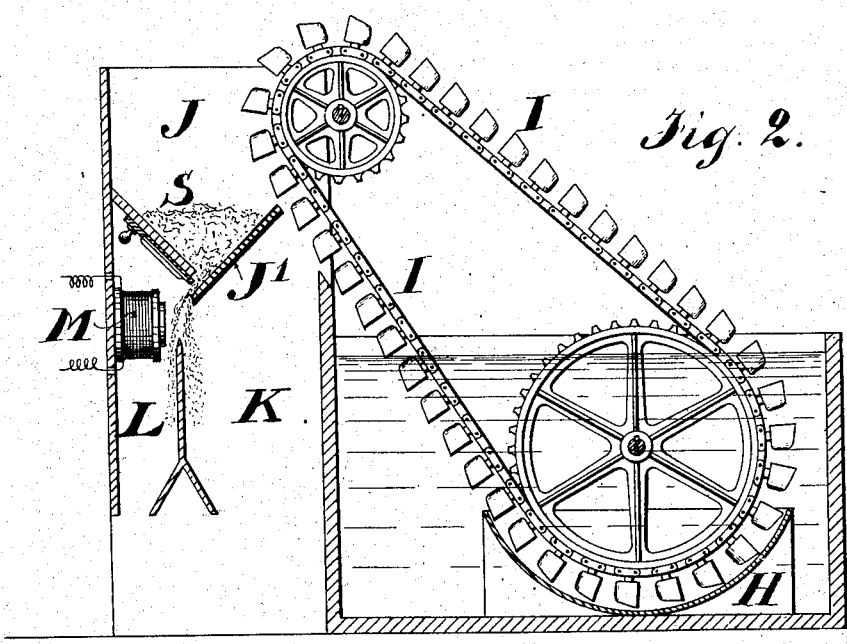

In the drawings, Figure 1 is a sectional side view of the electroplating means and elevator, and Fig. 2 is a transverse section of the apparatus at line $x^2$ in Fig. 1, showing a magnetic separator. These views are somewhat diagrammatic and are designed only to illustrate one form of apparatus for carrying out the process.

A designates a trough or tank containing a liquid electrolyte B, which may be a strong solution of sal-ammoniac. In the tank is rotatively mounted an iron shaft C, on which is carried an anode D, of iron, and a cathode E, also of iron. The anode is in electrical connection with the shaft; but the cathode, which is in the form of a conical drum, is mounted on the shaft exterior to the anode, but insulated electrically therefrom. Both the anode and cathode rotate in the liquid B. The positive pole of a generator G is connected at $p$, with the shaft C, and the negative pole thereof is connected at $n$ with the cathode. The connections may be made through suitable brushes. To put the apparatus in operative condition for starting, the current is turned on and the shaft rotated. Iron from the anode dissolves in the liquid B and hydrogen forms on the cathode. After sufficient iron has been thus dissolved the operation of plating the particles of gold in the granular mass may be undertaken.

From a hopper F and spout F' gold-bearing sand or other gold-bearing material is fed into the smaller end of the hollow cathode and flows slowly down the incline to the larger end, the rotation of the cathode serving to agitate and scatter it, so as to bring the particles of gold into contact with the cathode. Thus these particles receive a coating of iron and become susceptible to the attractive force of a magnet. On leaving the cathode-drum the material S falls into a receptacle H in the tank A and is lifted out therefrom by means of an elevator I, formed of an endless chain of buckets, from which the liquid drains back into the tank. The material carried up and containing the particles of gold plated with iron is dumped onto a hopper J, having an inclined platform J', Fig. 2, down which it slides and from the lower edge of which it falls in a thin flat stream before one or more powerful electromagnets M, which have their poles presented toward the descending stream. The mass of material being uninfluenced by the magnet falls directly downward into a receptacle or chute K, while the particles of iron-coated gold influenced by the magnet are deflected from their vertically-downward course and fall into an another receptacle or chute L. This magnetic separator is not new, and there are others which may be used as well. Indeed, the present invention is not limited to any plating and magnetic separating means, and any such means may be used.

It is well known that a number of metals are magnetic—such as iron, nickel, &c.—and that a number of others are diamagnetic—such as gold, silver, &c.—and while my object is in the main to plate particles of gold mixed with sand, quartz, and the like, and while iron is preferred as the coating metal because of its powerful paramagnetic qualities, the present invention is not strictly limited in this respect.

The material treated will be well dried by preference after its removal from the plating-bath and before it is subjected to treatment by the magnetic separator in order to eliminate more or less of its moisture, and thereby insure a more perfect separation of the metal from the accompanying matter. After the separation of the metal from the accompanying matter the magnetic and diamagnetic metals are separated by any suitable means.

By "diamagnetic metals" is herein meant the class of metals commonly called "non-magnetic."

I am aware that it has been proposed to combine auriferous particles in a mass with a mercury amalgam containing iron to form a magnetic amalgam of gold, iron, and mercury in order to thus separate the gold by magnetic means. This method I do not claim. My process does not include amalgamation or the use of mercury at all prior to separation, nor is the gold amalgamated with the iron in my process.

Having thus described my invention, I claim—

The herein-described process of separating solid particles of diamagnetic metal from accompanying matter, which consists in first coating with magnetic metal by electrolysis such diamagnetic particles, and then separating such coated metallic particles from the accompanying matter by magnetic means.

In witness whereof I have hereunto signed my name, this 29th day of July, 1903, in the presence of two subscribing witnesses.

LOUIS T. WEISS.

Witnesses:
 H. A. CONNETT,
 BENJAMIN H. HOLT.